(12) United States Patent
Lee

(10) Patent No.: US 10,393,297 B2
(45) Date of Patent: Aug. 27, 2019

(54) PIPE CONNECTION DEVICE AND MANUFACTURING METHOD THEREOF

(71) Applicant: JUNGWOO METAL IND. CO., LTD., Gyeonggi-do (KR)

(72) Inventor: Kwang Won Lee, Gyeonggi-do (KR)

(73) Assignee: Jungwoo Metal Ind. Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/309,097

(22) PCT Filed: Sep. 21, 2016

(86) PCT No.: PCT/KR2016/010505
§ 371 (c)(1),
(2) Date: Nov. 4, 2016

(87) PCT Pub. No.: WO2017/090872
PCT Pub. Date: Jun. 1, 2017

(65) Prior Publication Data
US 2018/0259101 A1 Sep. 13, 2018

(30) Foreign Application Priority Data
Nov. 23, 2015 (KR) .................. 10-2015-0163813

(51) Int. Cl.
*F16L 23/032* (2006.01)
*F16L 23/02* (2006.01)
(Continued)

(52) U.S. Cl.
CPC .............. *F16L 23/02* (2013.01); *B21D 17/02* (2013.01); *F16L 21/03* (2013.01); *F16L 23/0286* (2013.01); *F16L 23/032* (2013.01)

(58) Field of Classification Search
CPC .. F16L 23/0283; F16L 23/032; F16L 23/0286
(Continued)

(56) References Cited

U.S. PATENT DOCUMENTS 691,346 A * 1/1902 Barr ................. F16L 23/032
285/328
695,614 A * 3/1902 Lape ................. F16L 41/082
285/215
(Continued)

FOREIGN PATENT DOCUMENTS

GB       2211573      * 7/1989 .......... F16L 23/0283
JP       1995-042885    2/1995
(Continued)

OTHER PUBLICATIONS

Office Action dated Aug. 23, 2016 in KR Application No. 10-2015-0163813.

*Primary Examiner* — David Bochna
(74) *Attorney, Agent, or Firm* — Panitch Schwarze Belisario & Nadel LLP

(57) ABSTRACT

A pipe connection device according to the present invention includes: a connection member including a projection in which an insertion space is formed in the projection and a pipe is inserted through one side and which is bent in a circumferential direction at the other side and a separation preventing unit which is spaced apart from the projection and protrudes in the circumferential direction; and a flange member coupled to the circumference of the connection member between the projection and the separation preventing unit so as to contact the projection and having a joining hole penetrated by a joining member.

8 Claims, 12 Drawing Sheets

(51) Int. Cl.
*B21D 17/02* (2006.01)
*F16L 21/03* (2006.01)
*F16L 23/028* (2006.01)

(58) Field of Classification Search
USPC .................................. 285/412, 382.4, 382.5
See application file for complete search history.

(56) References Cited

U.S. PATENT DOCUMENTS

| | | | | |
|---|---|---|---|---|
| 1,291,646 | A * | 1/1919 | Hughes | F16L 23/024 285/222 |
| 3,533,449 | A * | 10/1970 | Gallinger | F16L 19/0286 138/109 |
| 4,330,144 | A * | 5/1982 | Ridenour | F16L 13/165 285/382.5 |
| 4,765,661 | A * | 8/1988 | Fukushima | F16L 19/046 285/353 |
| 4,770,447 | A * | 9/1988 | Umehara | F16L 41/086 285/189 |
| 5,713,611 | A * | 2/1998 | Kurimoto | F16L 41/082 285/222 |
| 5,961,153 | A * | 10/1999 | Foster | F16L 55/18 180/309 |
| 6,016,843 | A * | 1/2000 | Wada | F16L 23/024 138/109 |
| 6,206,437 | B1 * | 3/2001 | Humphreys | F16L 13/147 285/353 |
| 6,328,351 | B1 * | 12/2001 | Kato | F16L 41/086 285/205 |
| 8,056,208 | B2 * | 11/2011 | Karoliussen | F16L 23/024 29/523 |
| 8,083,268 | B2 * | 12/2011 | Jamison | F16L 21/03 285/374 |
| 8,764,070 | B2 * | 7/2014 | Park | F16L 23/0283 285/382.4 |
| 2006/0170208 | A1 * | 8/2006 | Arning | F16L 23/0283 285/56 |
| 2006/0244261 | A1 * | 11/2006 | Shah | F16L 19/0286 285/382 |
| 2007/0236017 | A1 * | 10/2007 | Henke | F16L 13/148 285/382.4 |
| 2010/0295296 | A1 * | 11/2010 | Kawamata | F16L 23/024 285/382.5 |
| 2012/0139236 | A1 | 6/2012 | Novitsky et al. | |
| 2016/0116092 | A1 * | 4/2016 | Sundholm | F16L 23/0283 285/412 |
| 2016/0245437 | A1 * | 8/2016 | Eriksson | F16L 23/0283 |

FOREIGN PATENT DOCUMENTS

| | | |
|---|---|---|
| JP | 2006-214583 | 8/2006 |
| KR | 10-0327831 B1 | 2/2002 |
| KR | 10-0688676 B1 | 2/2007 |
| KR | 100845953 B1 | 7/2008 |
| KR | 2013-0139279 A | 12/2013 |

* cited by examiner

PIPE CONNECTION DEVICE AND MANUFACTURING METHOD THEREOF

CROSS-REFERENCE TO RELATED APPLICATION

This application is a Section 371 of International Application No. PCT/KR2016/010505, filed Sep. 21, 2016, not yet published, and the disclosure of which is incorporated herein by reference.

TECHNICAL FIELD

The present invention relates to a pipe connection device and a manufacturing method thereof, and more particularly, to a pipe connection device for easily performing connection of a pipe in a site and simplifying a manufacturing process and a manufacturing method thereof.

BACKGROUND ART

A pipe connector for connecting various types of pipes is used in construction and civil fields. In addition, in general, such a pipe connector has openings into which the pipes are inserted at both sides and includes a plurality of components for fixing the pipes.

Representatively, Korean Patent Registration No. 10-0845953 discloses a pipe connector for connecting a pipe and according to Korean Patent Registration No. 10-0845953, it can be seen that the pipe connector includes a guide rod, a pressure stopper, a plurality of packings, a flange, and the like.

In the case of the pipe connectors in the related art, which include Korean Patent Registration No. 10-0845953, since the number of components constituting the pipe connector is large, a lot of efforts and time for assembling the components are consumed.

In addition, since a process for manufacturing each component is complicated and a production facility needs to be separately constructed for each component, the waste of cost is large.

Therefore, a method for solving the problems is requested.

DISCLOSURE

Technical Problem

The present invention has been made in an effort to solve the above-described problems associated with prior art and to provide a pipe connection device for allowing a pipe to be easily connected in a site by lowering a work level of difficulty for connecting the pipe.

The present invention also has been made in an effort to simplify a manufacturing process of each of components constituting the pipe connection device.

The objects of the present invention are not limited to the aforementioned objects, and other objects, which are not mentioned above, will be apparent to a person having ordinary skill in the art from the following description.

Technical Solution

In order to achieve the object, a pipe connection device according to the present invention includes: a connection member including a projection in which an insertion space is formed in the projection and a pipe is inserted through one side and which is bent in a circumferential direction at the other side and a separation preventing unit which is spaced apart from the projection and protrudes in the circumferential direction; and a flange member coupled to the circumference of the connection member between the projection and the separation preventing unit so as to contact the projection and having a joining hole penetrated by a joining member.

In addition, the connection member may include an insertion region having an inner diameter corresponding to an outer diameter of the pipe and an extension region extended so as to have an inner diameter larger than the inner diameter of the insertion region and having the projection and the separation preventing unit.

Further, a recess groove which is recessed may be formed on the inner periphery of the insertion region and a sealing member for preventing a fluid from leaking between the pipe and the connection member may be provided at the recess groove.

Moreover, a spacing distance of the projection and the separation preventing unit may be formed to be larger than the thickness of the flange member.

Further, the pipe connection device may further include a fitting member provided between the flange member and the connection member.

In addition, in order to achieve the object, a manufacturing method of a pipe connection device includes: forming a projection by bending the other side of a connection member having an insertion space formed therein; installing a flange member to contact the projection on the outer periphery of the connection member; and forming a separation preventing unit which protrudes in a circumferential direction at a position spaced apart form the projection of the connection member.

Further, in the forming of the separation preventing unit, as a sintering tool of which a rotational shaft is eccentric rotates and the sintering tool moves on the inner periphery of the connection member, the outer periphery of the connection member may be sintering-deformed by external force of the sintering tool and protrudes to form the separation preventing unit.

Moreover, the manufacturing method of a pipe connection device may further include, before the forming of the projection, forming an insertion region having an inner diameter corresponding to an outer diameter of a pipe inserted into the insertion space by reducing and expanding a part of the connection member and an extension region having an inner diameter larger than the inner diameter of the insertion region.

Further, the manufacturing method of a pipe connection device may further include forming a recess groove on the inner periphery of the insertion region between the forming the projection and the installing of the flange member to contact the projection.

In addition, the manufacturing method of a pipe connection device may further include installing a fitting member at a position corresponding to the flange member on the outer periphery of the connection member between the installing of the flange member to contact the projection and the forming of the separation preventing unit.

Advantageous Effects

A pipe connection device and a manufacturing method thereof according to the present invention, which are used for solving the problems achieve the following effects.

First, since the number of components is minimized to significantly reduce a work level of difficulty for connecting a pipe, the pipe can be easily connected.

Second, leakage of a fluid can be effectively prevented due to minimization of the number of components.

Third, as a manufacturing process of the pipe connection device is simplified, manufacturing cost can be significantly saved.

The effects of the present invention are not limited to the aforementioned effect, and other effects, which are not mentioned above, will be apparent to a person having ordinary skill in the art from description of claims.

BEST MODE

Figure 1:
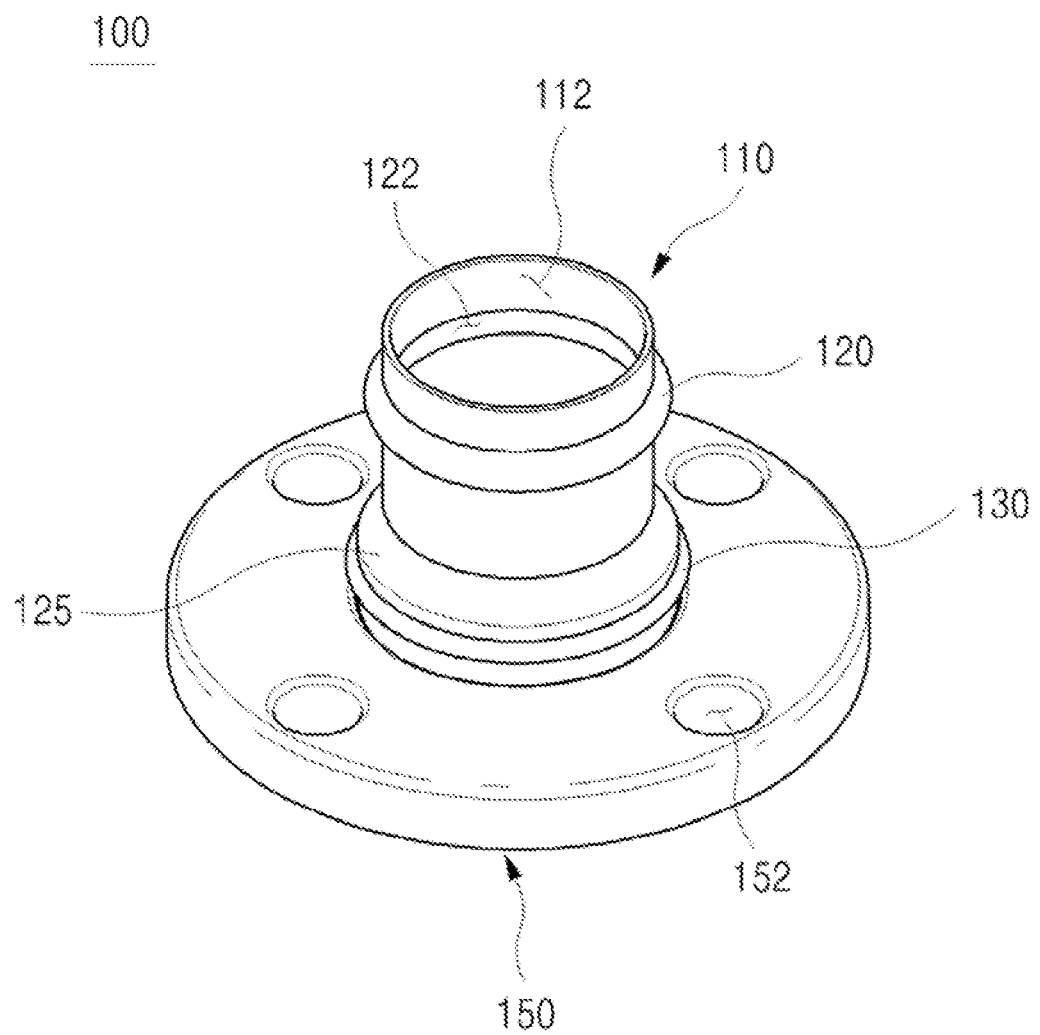
FIGS. 1 and 2 are diagrams illustrating a shape of a pipe connection device according to an embodiment of the present invention.

Hereinafter, preferred embodiments of the present invention, in which a purpose of the present invention can be realized in detail will be described with reference to the accompanying drawings. In describing the embodiments, the same name and the same reference numerals are used with respect to the same component and the resulting additional description will be omitted.

Figure 2:
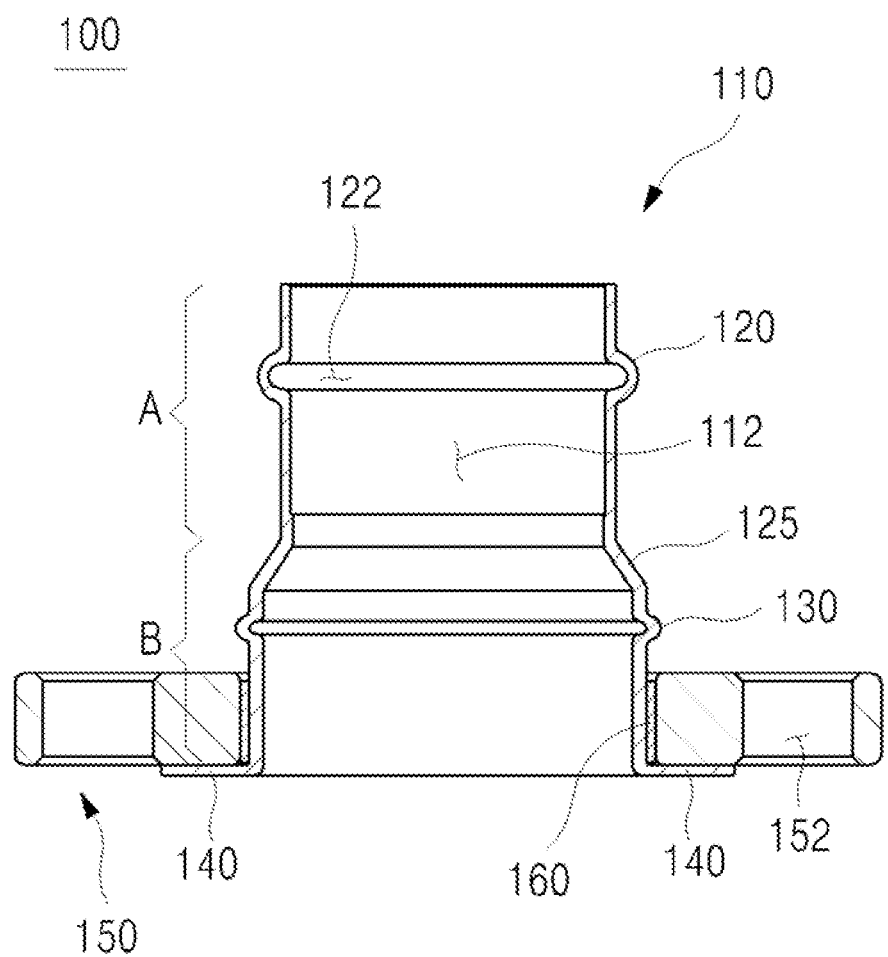

FIGS. 1 and 2 are diagrams illustrating a shape of a pipe connection device 100 according to an embodiment of the present invention.

As illustrated in FIGS. 1 and 2, the pipe connection device 100 according to the embodiment of the present invention includes a connection member 110 and a flange member 150.

An insertion space 112 is formed in the connection member 110 and the connection member 110 is formed so that a pipe is inserted into the insertion space 112 through one side.

In this case, a projection 140 which is bent in a circumferential direction is formed at the other side of the connection member 110 and the projection 140 serves as a stopper so as to prevent the flange member 150 from being separated toward the other side of the connection member 110.

Further, the connection member 110 includes a separation preventing unit 130 which is spaced apart form the projection 140 and projected in the circumferential direction and the separation preventing unit 130 also serves as the stopper so as to prevent the flange member 150 from being separated toward one side of the connection member 110.

In particular, in the embodiment, the connection member 110 includes an insertion region A having an inner diameter corresponding to an outer diameter of the pipe to be inserted into the insertion space 112 and an extension region which extends to have an inner diameter larger than the inner diameter of the insertion region A and has the projection 140 and the separation preventing unit 130.

In this case, a slope 125 may be formed between the insertion region A and the extension region B and this is to minimize resistance by a step formed between the insertion region A and the extension region B while a fluid flows.

In addition, in the case of the embodiment, the recess groove 122 which is recessed is formed on the inner periphery of the insertion region A and a sealing member (30, see FIG. 3) preventing the fluid from leaking between the pipe and the connection member 110 may be provided at the recess groove 122. As such, the recess groove 122 is formed, and as a result, a protrusion 120 is formed on an exterior of the connection member 110.

The flange member 150 is positioned between the projection 140 of the connection member 110 and the separation preventing unit 130 as described above, and as a result, the flange member 150 is fixed so as not to be separated from the connection member 110.

In addition, the flange member 150 is formed to have a larger diameter than the connection member 110 to serve to be coupled with the flange member 150 of the other pipe connection device and to this end, a joining hole 152 which a joining member penetrates is formed in the flange member 150.

In this case, in the embodiment, a spacing distance between the projection 140 and the separation preventing unit 130 is formed to be larger than a thickness of the flange member 150 itself, and as a result, a gap is formed between the flange member 150 and the separation preventing unit 130. The reason is to minimize damage against a case where external force is applied to or vibration is generated in the flange member 150 by providing a clearance which is slightly movable to the flange member 150.

Further, in the case of the embodiment, the fitting member 160 is provided between the flange member 150 and the connection member 110. The fitting member 160 may be made of an elastic material and serve as an insulator capable of heterogeneous metal potential together with compensation for the gap between the flange member 150 and the connection member 110.

That is, the fitting member 160 prevents the flange member 150 from being loosed on the outer periphery of the connection member 110 to stably fix the flange member 150 onto the connection member.

Figure 3:
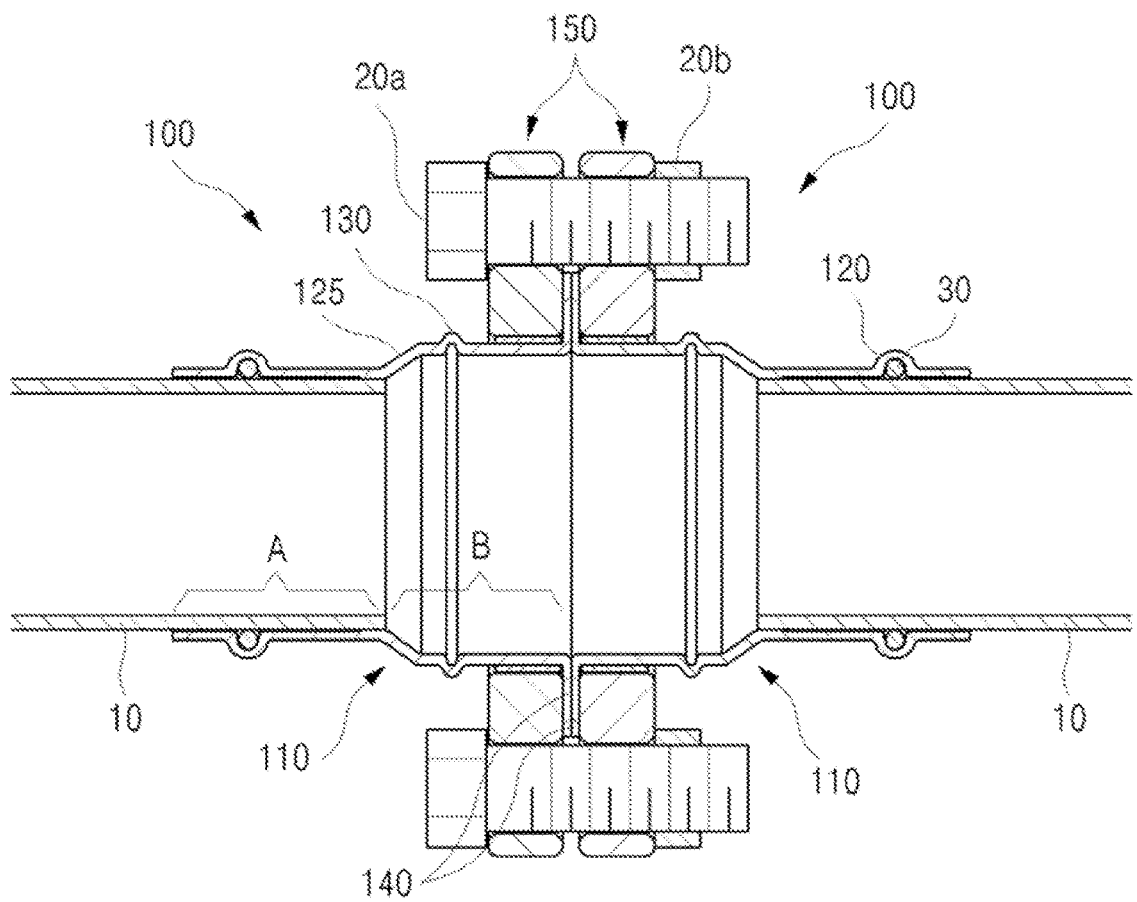
FIG. 3 is a diagram illustrating a use aspect of a pipe connection device according to an embodiment of the present invention.

FIG. 3 is a diagram illustrating a use aspect of a pipe connection device 100 according to an embodiment of the present invention.

As illustrated in FIG. 3, a pair of pipe connection devices 100 of the present invention are provided in order to connect the pipe 10 and positioned to face opposite directions to each other, and as a result, the projections 140 of the connection members 110 are provided to contact each other.

In such a state, as a bolt type joining member 20a penetrates the joining hole 152 formed in each flange member 150 of each pipe connection device 100 and a nut type joining member 20b is coupled to the bolt type joining member 20b, a pair of pipe connection devices 100 may be fixed to each other.

In this case, the flange member 150 is made of the insulator to prevent each connection member 110 and the joining members 20a and 20b from being electrically connected with each other.

In addition, the pipe 10 is inserted into the insertion region A of the connection member 110, and as a result, a pair of pipes 10 are in communication with each other. Further, as described above, the sealing member 30 is provided at the recess groove 122 of each connection member 110 to prevent the fluid from leaking.

As described above, in the pipe connection device according to the present invention, the number of components is minimized to significantly reduce a work level of difficulty for connecting the pipe 10 and effectively prevent the fluid from leaking.

Hereinafter, a manufacturing process of a pipe connection device according to the present invention will be described with reference to FIGS. 4 to 12.

Figure 4:
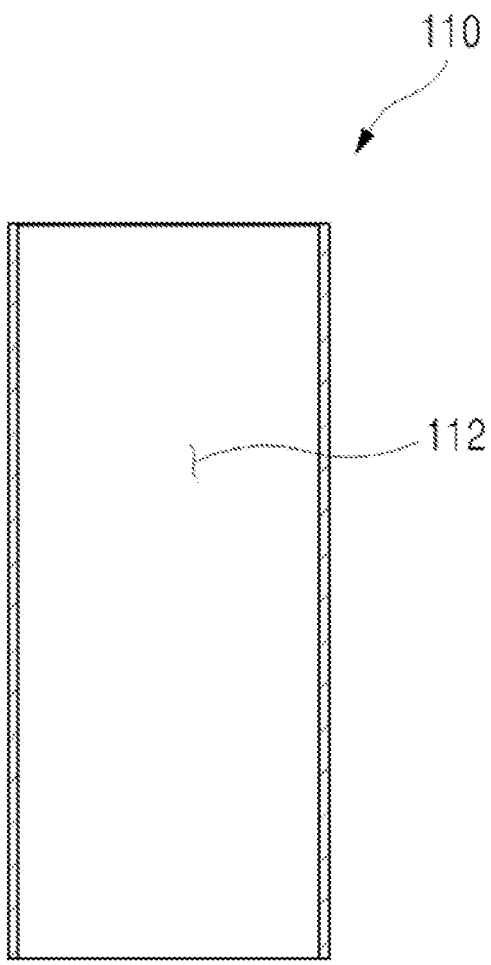
FIG. 4 is a diagram illustrating a shape of a connection member before processing in a manufacturing method of a pipe connection device according to an embodiment of the present invention.

First, the connection member 100 is prepared before processing as illustrated in FIG. 4. The connection member 100 is formed in a pipe shape, and as a result, the connection member 100 has a shape in which the insertion space 112 is formed in the connection member 100.

Figure 5:
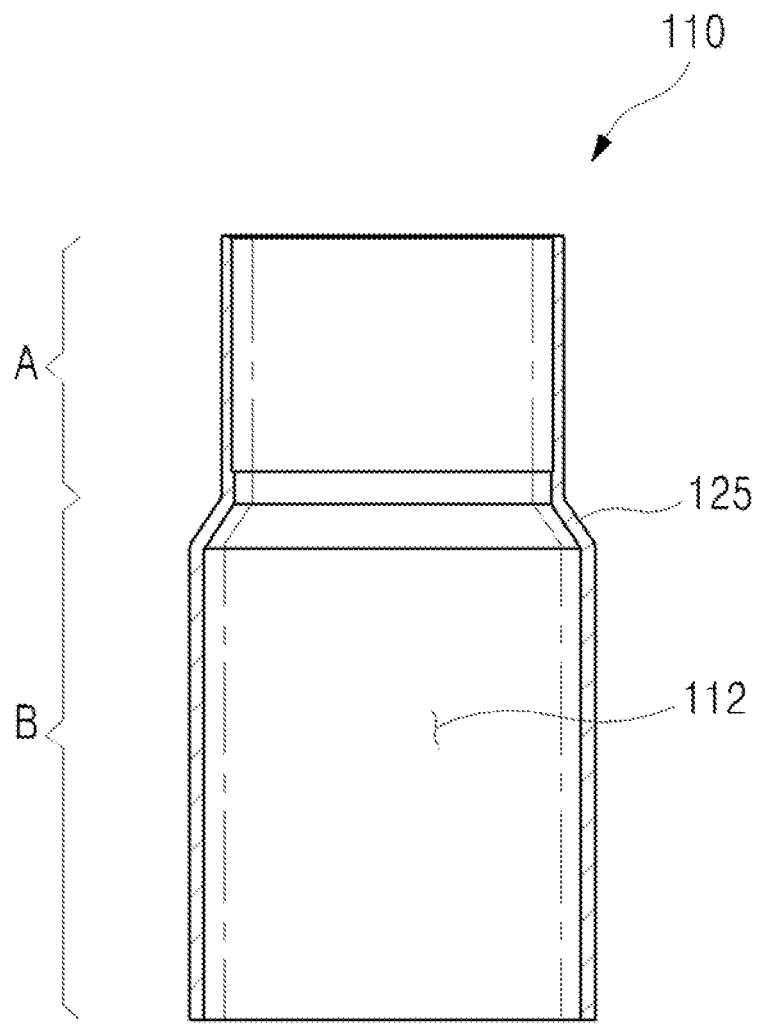
FIG. 5 is a diagram illustrating a shape in which a part of the connection member is reduced in the manufacturing method of a pipe connection device according to the embodiment of the present invention.

In such a state, a step of reducing and expanding a part of the connection member 110 is performed as illustrated in FIG. 5. In this step, a part of the connection member 110 is reduced and expanded based on a predetermined position of the connection member 110 to partition the insertion region A and the extension region B and as described above, the slope 125 may be formed between the insertion region A and the extension region B.

Figure 6:
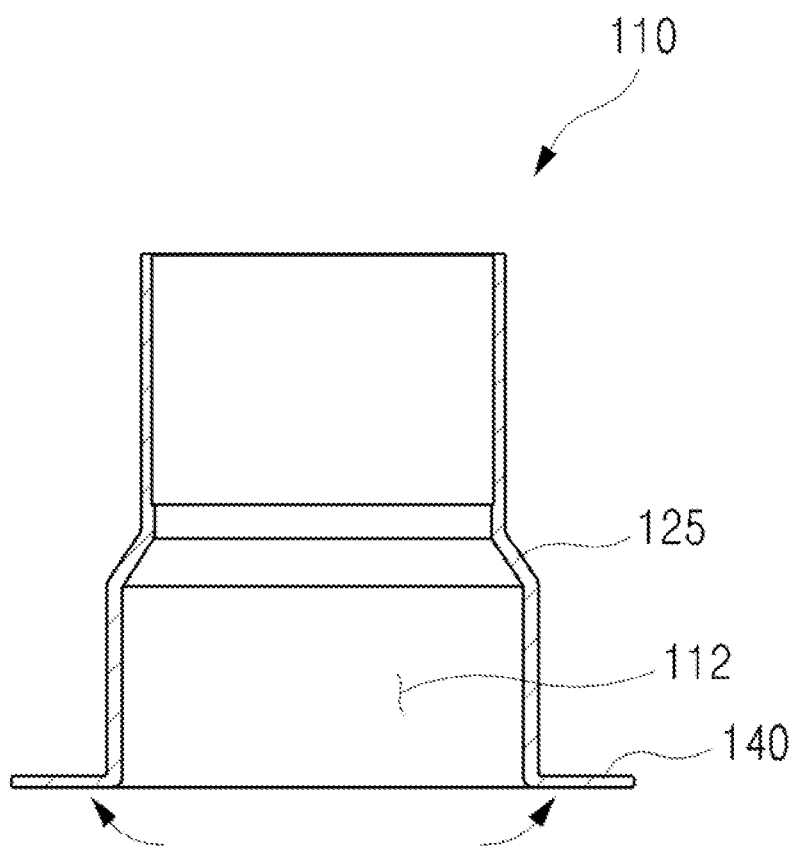
FIG. 6 is a diagram illustrating a shape in which a projection is formed in the manufacturing method of a pipe connection device according to the embodiment of the present invention.

Next, a step of forming the projection 140 by bending the other side of the connection member 110 is performed as illustrated in FIG. 6. In this step, the other side of the connection member 110 is bent outwards through a press device, and the like to form the projection 140 and in this case, the length of the projection 140 may be determined by considering the position of the joining hole 152 of the flange member (150, see FIG. 2).

Figure 7:
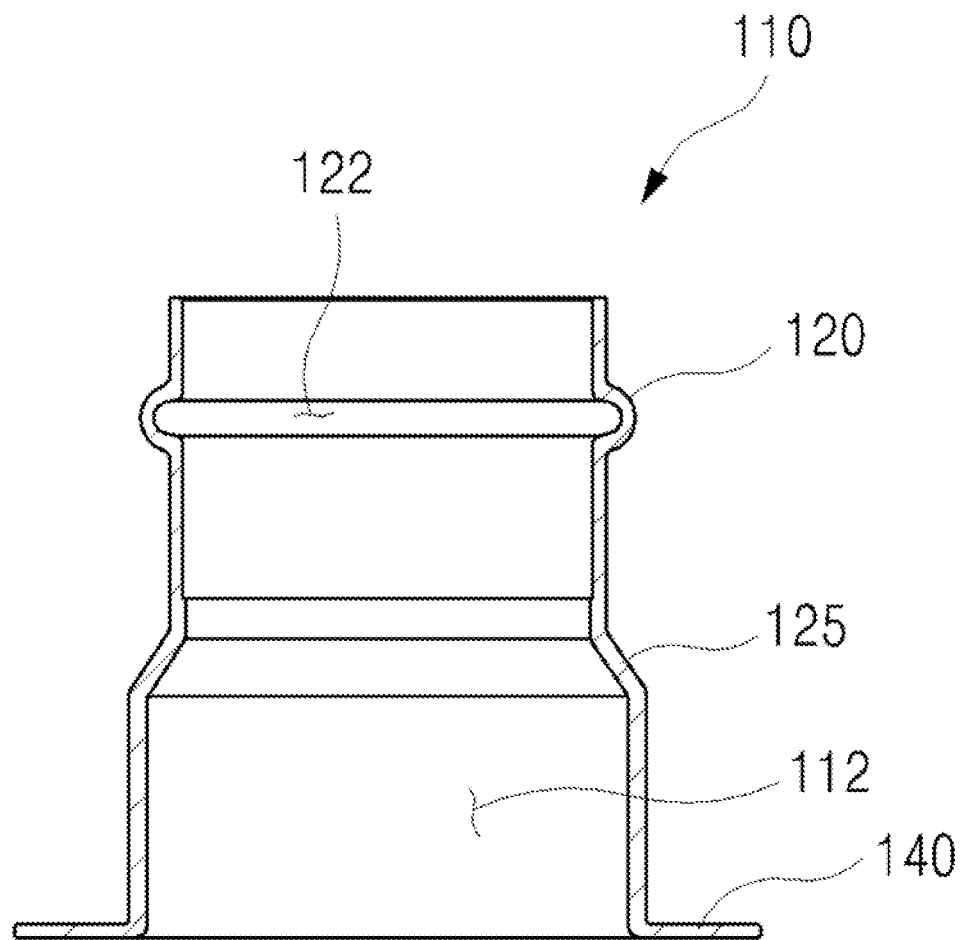
FIG. 7 is a diagram illustrating a shape in which a recess groove is formed in the manufacturing method of a pipe connection device according to the embodiment of the present invention.

Thereafter, as illustrated in FIG. 7, a step of forming the recess groove 122 on the inner periphery of the insertion region A of the connection member 110 is performed. In this step, the external force is applied from the inner periphery of the insertion region A to protrude the connection member 110, and as a result, the recess groove 122 is formed inside the protrusion 120.

Figure 8:
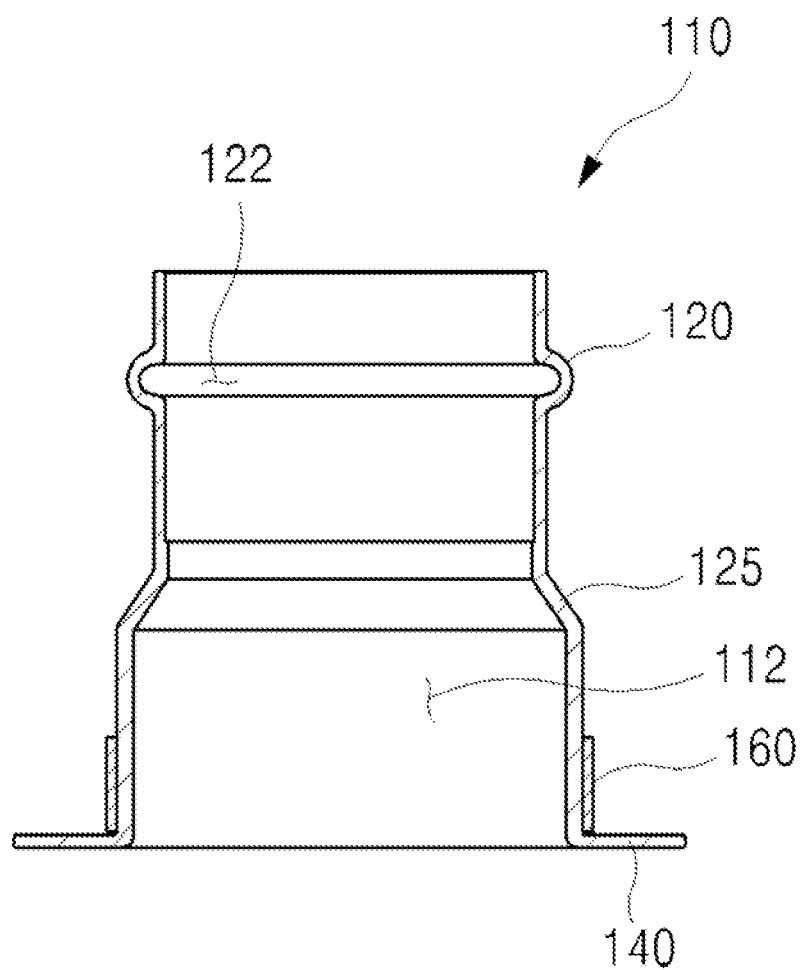
FIG. 8 is a diagram illustrating a shape in which a fitting member is installed in the manufacturing method of a pipe connection device according to the embodiment of the present invention.
Figure 9:
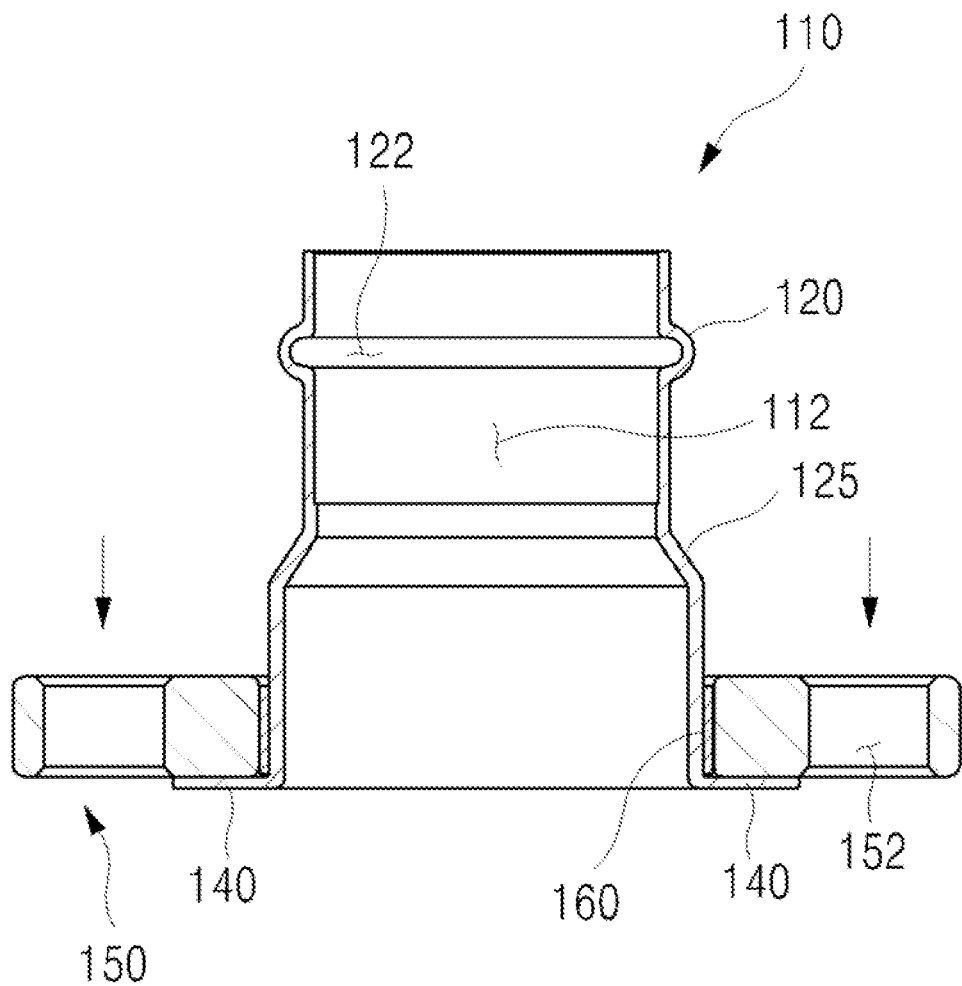
FIG. 9 is a diagram illustrating a shape in which a flange member is installed in the manufacturing method of a pipe connection device according to the embodiment of the present invention.

Next, each of a step of installing the fitting member 160 on the outer periphery of the connection member 110 as illustrated in FIG. 8 and a step of installing the flange member 150 on the circumference of the connection member 110 as illustrated in FIG. 9 is performed.

In this case, the fitting member 160 is installed at a position corresponding to the flange member 150 to be hereafter installed and in the case of the embodiment, the fitting member 160 is installed adjacent to the projection 140 of the connection member 110.

Thereafter, the flange member 150 is installed to cover the exterior of the fitting member 160 and the protrusion 120 is formed at the insertion region (A, see FIG. 5) of the connection member 110, and as a result, the protrusion 120 does not interfere with an installation process of the flange member 150.

Figure 10:
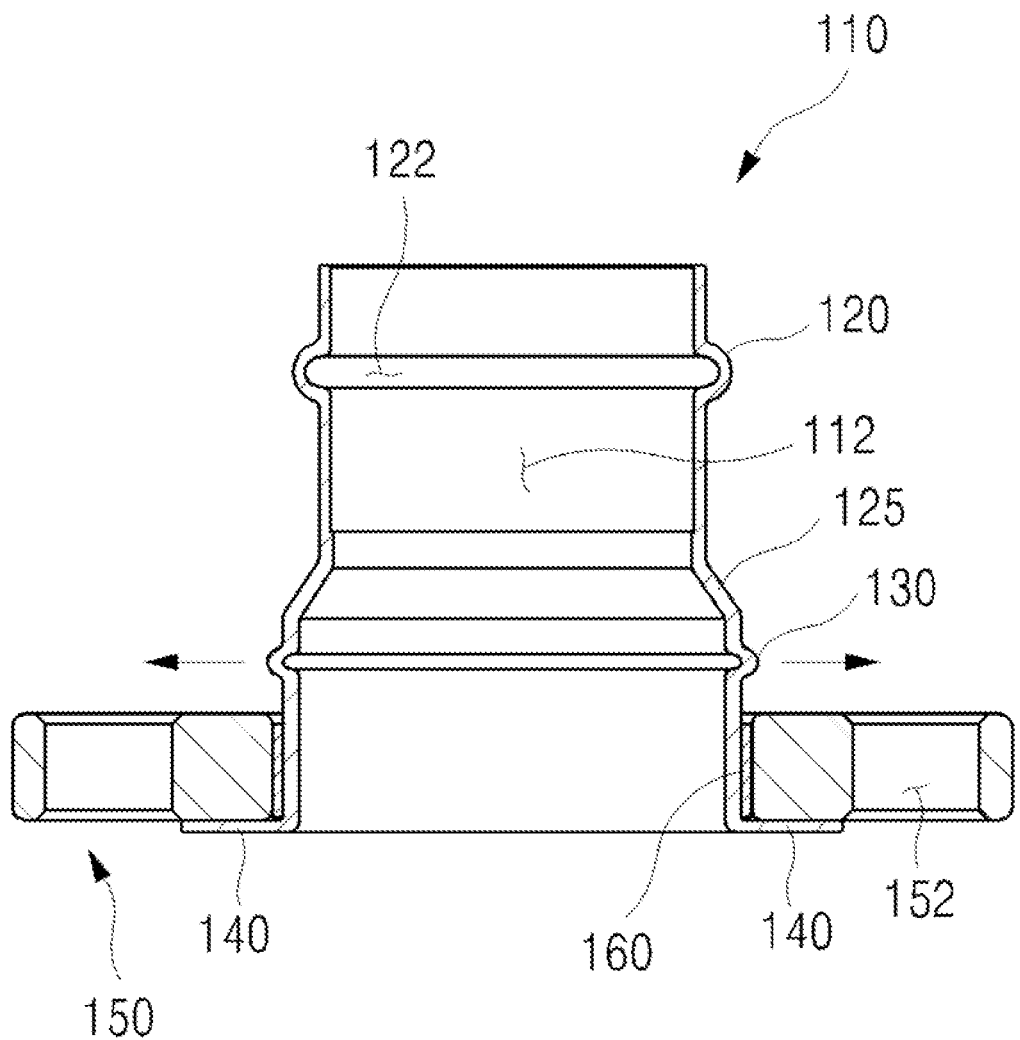
FIG. 10 is a diagram illustrating a shape in which a separation preventing unit is formed in the manufacturing method of a pipe connection device according to the embodiment of the present invention.

Next, a step of forming the separation preventing unit 130 which protrudes in the circumferential direction at a position which is spaced apart from the projection 140 of the connection member 110 as illustrated in FIG. 10 is performed.

As described above, the separation preventing unit 230 serves to prevent the flange member 150 from being separated to one side of the connection member 110 and to this end, the step of forming the separation preventing unit 130 is performed after the step of installing the flange member 150.

Figure 11:
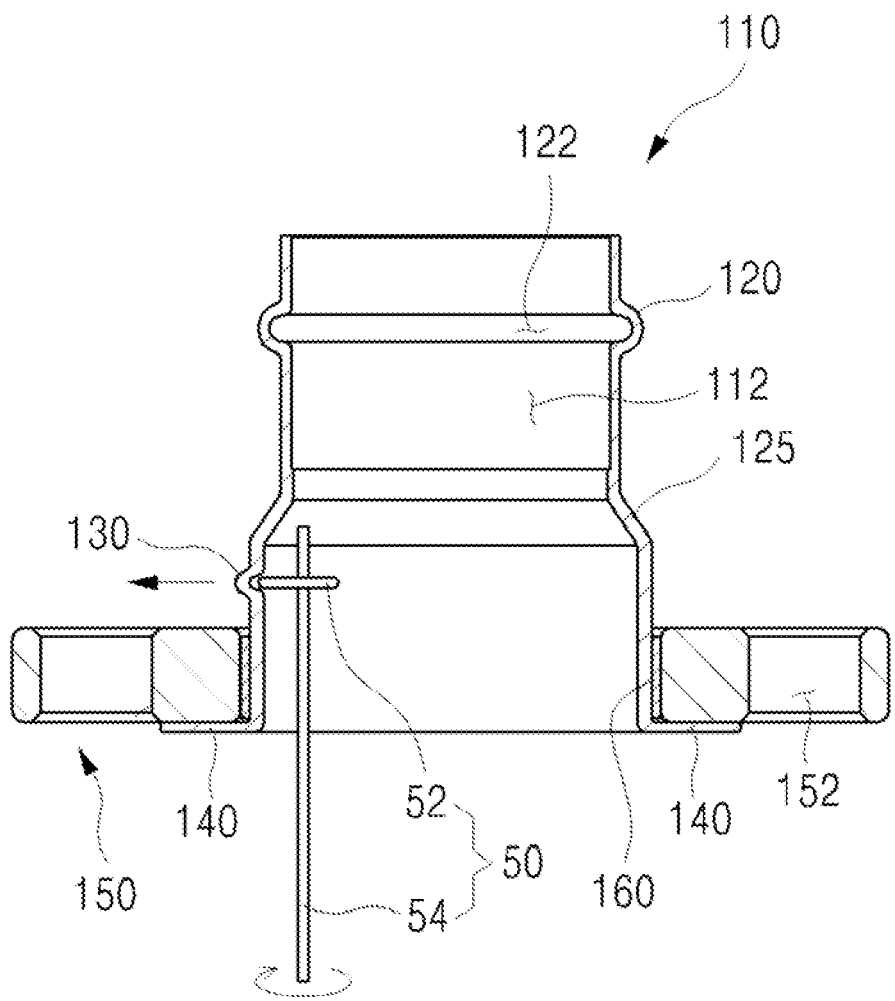
FIGS. 11 and 12 are diagrams illustrating, in detail, a process of forming the recess groove in the manufacturing method of a pipe connection device according to the embodiment of the present invention.
Figure 12:
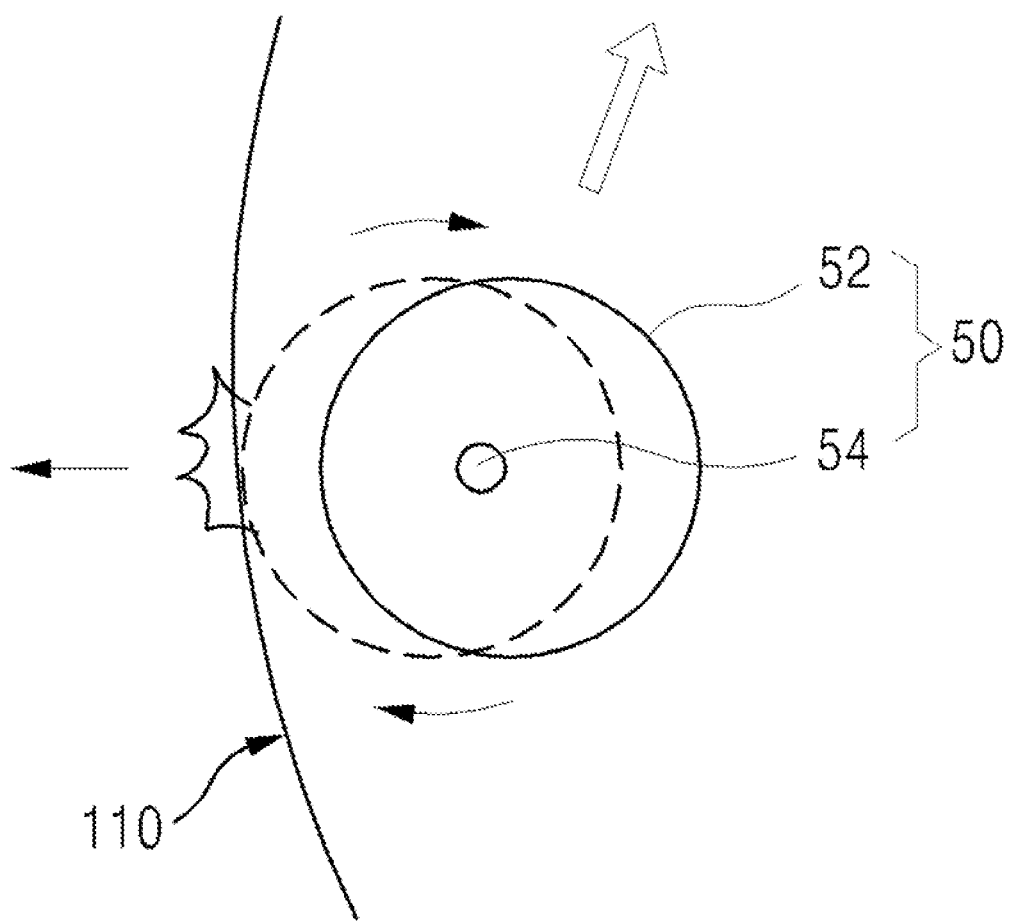

In detail, in this step, a sintering tool 50 illustrated in FIGS. 11 and 12 may be used. The sintering tool 50 includes a rotation bar 54 and a sintering member 52 and in this case, the rotation bar 54 is connected to an eccentric position of the sintering member 52.

Accordingly, when the rotation bar 54 is rotated while the sintering member 52 is positioned adjacent to the inner periphery of the connection member 110, the outer periphery of the connection member 110 is sintering deformed by the external force of the sintering member 52 to protrude while being pushed outwards. In addition, as the sintering tool 50 itself moves on the periphery of the connection member 110 while the sintering member 52 is maintained to rotate, the entirety of the separation preventing unit 130 may be formed.

A preferred embodiment of the present invention has been described as above and a fact that the present invention can be materialized in other specific forms without departing from the gist or scope even except for the above described embodiment is apparent to those skilled in the art. Therefore, the aforementioned embodiment is not limited but needs to be exemplary, and as a result, the present invention is not limited to the above description and modified within the scope of the appended claims and a range equivalent thereto.

SEQUENCE LIST TEXT

10: Pipe
50: Sintering tool
52: Beat member
54: Rotation bar
100: Pipe connection device
110: Connection member
112: Insertion space
120: Protrusion
122: Recess groove
125: Slope
130: Separation preventing unit
140: Projection
150: Flange member
152: Joining hole
160: Fitting member

The invention claimed is:

1. A pipe connection device comprising:
   a connection member including a projection in which an insertion space is formed in the projection and a pipe is inserted through one end and which is bent in a circumferential direction at an other end and a separation preventing unit which is spaced apart from the projection and protrudes in the circumferential direction; and
   a flange member coupled to the circumference of the connection member between the projection and the separation preventing unit so as to contact the projection and having a joining hole penetrated by a joining member,
   wherein the connection member includes an insertion region having an inner diameter corresponding to an outer diameter of the pipe and an extension region extended so as to have an inner diameter larger than the inner diameter of the insertion region and having the projection and the separation preventing unit.

2. The pipe connection device of claim 1, wherein a recess grove which is recessed is formed on the inner periphery of the insertion region, and
   a sealing member for preventing a fluid from leaking between the pipe and the connection member is provided at the recess groove.

3. The pipe connection device of claim 1, wherein a spacing distance of the projection and the separation preventing unit is formed to be larger than the thickness of the flange member.

4. The pipe connection device of claim 1, further comprising:
   a fitting member provided between the flange member and the connection member.

5. A manufacturing method of a pipe connection device, comprising:
   forming a projection by bending an end of a connection member having an insertion space formed therein;
   installing a flange member to contact the projection on the outer periphery of the connection member; and
   forming a separation preventing unit which protrudes in a circumferential direction at a position spaced apart from the projection of the connection member,
   wherein in the forming of the separation preventing unit,
   as a sintering tool of which a rotational shaft is eccentric rotates and the sintering tool moves on the inner periphery of the connection member, the outer periphery of the connection member is sintering-deformed by external force of the sintering tool and protrudes to from the separation preventing unit.

6. The manufacturing method of a pipe connection device of claim 5, further comprising:
   between the installing of the flange member to contact he projection and the forming of the separation preventing unit,
   installing a fitting member at a position corresponding to the flange member on the outer periphery of the connection member.

7. The manufacturing method of a pipe connection device comprising;
   forming a projection by bending an end of a connection member having an insertion space formed therein;
   installing a flange member to contact the projection on the outer periphery of the connection member; and
   forming a separation preventing unit which protrudes in a circumferential direction at a position spaced apart from the projection of the connection member;
   before the forming of the projection,
   forming an insertion region having an inner diameter corresponding to an outer diameter of a pipe inserted into an insertion space by reducing and expanding a part of the connection member and an extension region having an inner diameter larger than the inner diameter of the insertion region.

8. The manufacturing method of a pipe connection device of claim 7, further comprising:
   between the forming the projection and the installing of the flange member to contact the projection,
   forming a recess groove on the inner periphery of the insertion region.

* * * * *